Figure 1:
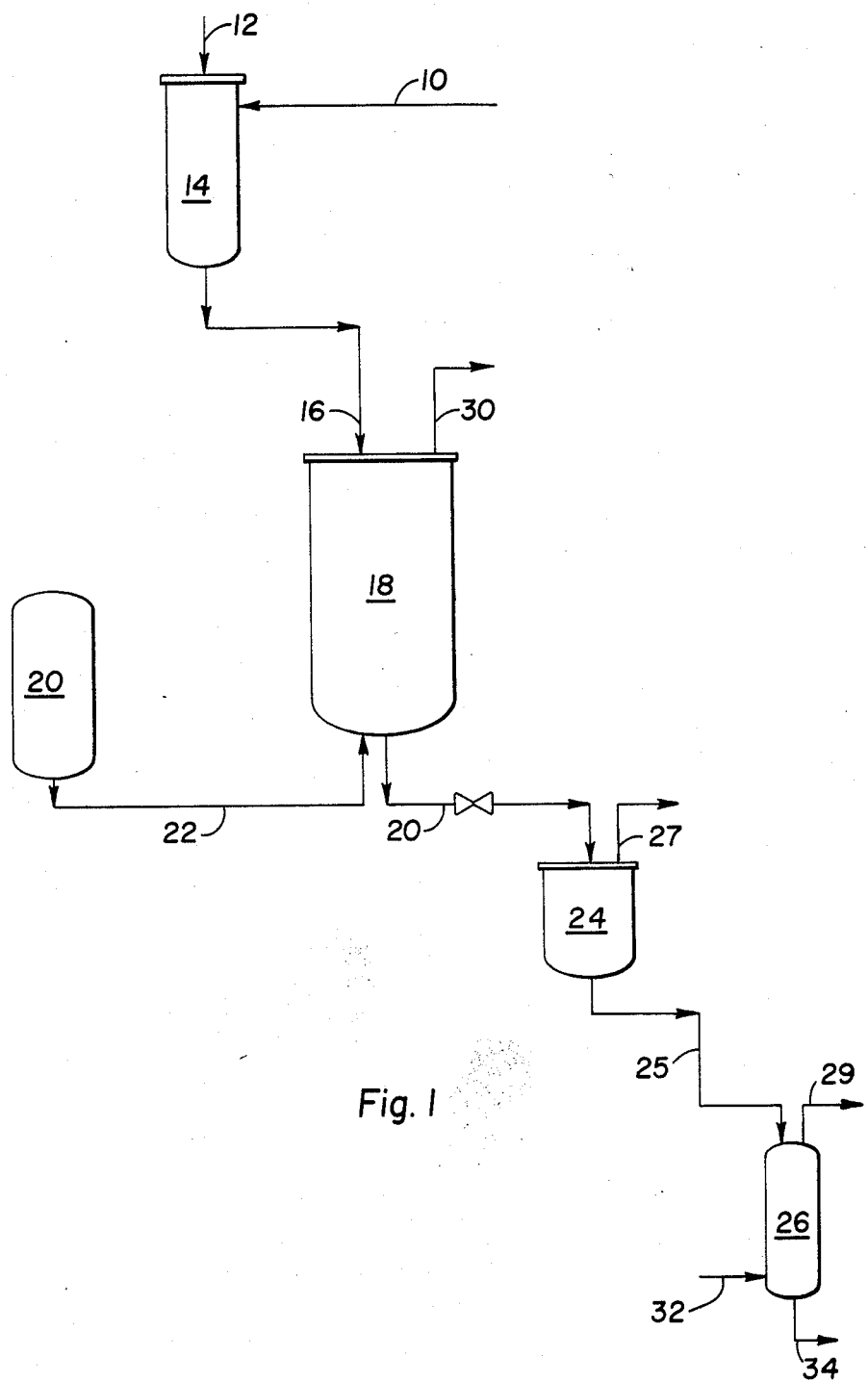

United States Patent [19]

Jenkins et al.

[11] Patent Number: 4,649,186

[45] Date of Patent: Mar. 10, 1987

[54] PROCESS FOR PREPARING COPOLYMERS OF ETHYLENE AND VINYL ACETATE

[75] Inventors: Waylon L. Jenkins, Kingsport; Deborah T. Hodge, Blountville; Kendree J. Sampson, Kingsport, all of Tenn.

[73] Assignee: Eastman Kodak Company, Rochester, N.Y.

[21] Appl. No.: 750,203

[22] Filed: Jul. 1, 1985

[51] Int. Cl.⁴ .............................................. C08F 2/06
[52] U.S. Cl. .................................... 526/87; 526/78; 526/218.1; 526/219.6; 526/331
[58] Field of Search ............... 526/87, 331, 78, 218.1, 526/219.6; 524/765; 525/60

[56] References Cited

U.S. PATENT DOCUMENTS 3,159,608 12/1964 Ilnyckyj ............................ 526/87 X
3,211,712 10/1965 Matsumoto et al. ........... 524/765 X
4,485,225 11/1984 Satoh et al. ........................ 526/331

OTHER PUBLICATIONS

CA 100: 86672p (1984).

Primary Examiner—Joseph L. Schofer
Assistant Examiner—F. M. Teskin
Attorney, Agent, or Firm—John F. Stevens; William P. Heath, Jr.

[57] ABSTRACT

Disclosed is a process for producing copolymers of ethylene and vinyl acetate in a continuous stirred-tank reactor in which the ethylene and vinyl acetate are premixed and the reactor is continuously purged.

5 Claims, 1 Drawing Figure

PROCESS FOR PREPARING COPOLYMERS OF ETHYLENE AND VINYL ACETATE

TECHNICAL FIELD

This invention relates to a process for producing copolymers of ethylene and vinyl acetate, and more specifically this invention relates to such a process whereby a steady state condition is maintained in a continuous stirred-tank reactor (CSTR).

BACKGROUND OF THE INVENTION

Copolymers of ethylene and vinyl acetate (EVAC) containing between 20 and 50 mole % ethylene are of interest because they are precursors to corresponding ethylene/vinyl alcohol copolymers which have outstanding gas barrier properties for use in packaging applications. Because these applications involve extrusion and molding of the polymer, it is very important to control the molecular weight distribution to minimize variations in processability. In order to produce a uniform product it is therefore preferred to prepare the EVAC in a continuous process.

Most copolymers of ethylene and vinyl acetate containing greater than 50% vinyl acetate are prepared by emulsion polymerization. However, solution polymerization produces polymer that is better suited as a precursor to ethylene-vinyl alcohol copolymer for barrier applications. The use of a CSTR to carry out a continuous solution polymerization is well-known, but in order to maintain a steady-state condition in such a reactor several problems must be overcome. By definition a steady-state condition requires that all variables must be held constant, including temperature and concentrations of all reactants and products.

The copolymerization of vinyl acetate and ethylene is a reaction that is particularly difficult to control because the desired operating state is an unstable one with respect to ethylene concentration. If an upset occurs, the system does not react by returning to the original state or by going to a new state slightly displaced from the original operating condition. Instead, the system begins to drift with the result that the conversion, molecular weight, and composition all move away from the desired values. This is a result of the complex relationships between composition, rate of polymerization, and molecular weight. For example, as the proportion of ethylene decreases, the overall rate of polymerization increases and the molecular weight increases. Together these factors result in a higher degree of conversion and a more viscous reaction medium. These conditions result in a further rate increase and higher molecular weight polymer. Thus, a cycle is begun which results in a continuing drift in molecular weight and degree of conversion. This problem is further compounded by the fact that as the viscosity increases the rate of diffusion of ethylene into the reaction medium is slowed, and at some point the rate of diffusion of ethylene into the reaction mixture becomes slower than the rate of polymerization. When this occurs, the control problem becomes much more severe since the composition also begins to drift, causing further upset to the system. Therefore, it is imperative to ensure that the introduction of ethylene into the reaction mixture does not become limited by solution viscosity such that compositional drift begins to destabilize the system. The ethylene concentration can also drift if another gas is introduced into the system. For example, if nitrogen is used to pressure feed streams, nitrogen will be introduced into the reactor and contribute to the pressure. If the total pressure is held constant, the ethylene pressure will decline as the nitrogen pressure increases.

This invention provides techniques to prevent drift in ethylene composition in the reaction mixture. The first technique concerns a method of handling the ethylene with the vinyl acetate by premixing to ensure a constant ratio of the two monomers in the reaction mixture. Another technique concerns a method to ensure that the equilibrium concentration of ethylene is not altered by a buildup of inert gas introduced through the feeds. Continuous processes for making ethylene-vinyl acetate copolymers in solution are known. For example, see Ch. Abs. 100:86672p. Such processes may use methanol as a solvent and be operated at a temperature of 60° C. and a pressure between 550 and 700 psi. The initiator is a radical initiator such as azobis(isobutyronitrile) (AIBN). Patents of interest include U.S. Pat. No. 3,847,845.

DESCRIPTION OF THE INVENTION

The present invention provides a process for producing a copolymer of ethylene and vinyl acetate in a continuous stirred tank reactor which contains a reaction mixture comprising ethylene, vinyl acetate, ethylene-vinyl acetate copolymer, catalyst and solvent, and in which reactants are continuously fed into the reactor and reaction mixture having a degree of conversion of 10–50% is continuously withdrawn. The present invention provides the improvement of maintaining the reaction in a steady-state condition which comprises the steps of (a) introducing vinyl acetate and ethylene monomers into the reaction mixture in a ratio such as to result in 20–50 mol % ethylene repeat units in the copolymer and in a premixed condition in which ethylene is dissolved in the vinyl acetate, and (b) maintaining the ethylene pressure at about 300–1000 psi and the reaction temperature at about 50°–90° C., and (c) continuously purging the free headspace with ethylene to keep the ethylene pressure substantially constant.

This invention improves the stability of operation of a continuous stirred-tank reactor used for the copolymerization of ethylene and vinyl acetate. The copolymerization is carried out typically under an ethylene pressure between 300 and 1000 psi at temperatures between 50° and 90° C. A lower alcohol of 1–8 carbon atoms, usually either methanol or t-butanol, is used as a solvent in combination with the ethylene and vinyl acetate monomer present in the reaction mass. The preferred steady-state conversion is between 10 and 50%.

In order to maintain a steady state, it is essential to maintain a constant ethylene concentration in the polymerization medium. Assuming that a constant pressure is maintained, the ethylene concentration may deviate from the desired value because of either kinetic or thermodynamic reasons. First, if the viscosity increases, the rate of diffusion across the phase boundary will be lowered. At some point the mass transfer will become slower than the rate of polymerization of ethylene in the system, and the ethylene concentration in the polymerization medium will fall below the equilibrium value and a drift in composition, molecular weight, and degree of conversion will begin. This invention overcomes this problem by introducing the vinyl acetate into the vapor phase of the reactor so that the ethylene is dissolved when the vinyl acetate is low in viscosity and is present with a large surface area. Because the reactivities of ethylene and vinyl acetate are such that they are consumed at the same rate under a given set of conditions, the ratio between the two monomers will remain constant as the monomer stream enters the liquid phase. A second cause of an unstable ethylene concentration despite a constant ethylene pressure will result from a buildup of inert gas dissolved in the feed streams. As the inert gas concentration increases, the ethylene concentration will decline although the total pressure will remain constant. To overcome this problem, this invention prevents a buildup of unwanted gasses through a slow purge of the vapor phase.

As stated above, the vinyl acetate and ethylene monomers are introduced into the reaction mixture in a premixed condition in which ethylene is dissolved in the vinyl acetate. This may be accomplished in several ways. A preferred way is to use a conventional packed column leading directly to the reactor in which liquid vinyl acetate monomer is brought into contact with gaseous ethylene. The packed column is preferably placed above the reactor. The packed column is saturated with ethylene gas, and vinyl acetate is allowed to flow through the column, during which time the ethylene and vinyl acetate are thoroughly contacted with each other and the ethylene dissolves in the vinyl acetate. This solution then passes to the reaction mass in the reactor, where proper reaction conditions are present (temperature, pressure, and presence of catalyst). The reaction mass contains a heel of ethylene/vinyl acetate copolymer polymerized to a conversion of about 10-50%, unreacted ethylene, catalyst and alcohol solvent.

Other ways of premixing the ethylene and vinyl acetate include spraying the liquid vinyl acetate into the reactor headspace which contains the ethylene gas.

Suitable nonreactive solvents include alcohols of 1-8 carbon atoms, preferably the lower alcohols such as methanol. Nonreactive solvents are used in an amount of 0-50%, preferably 5-30% by weight.

Suitable initiators are conventional free-radical type initiators such as 2,2'-azobis(isobutyronitrile), 2,2'-azobis(2,4-dimethylvaleronitrile), 2,2'-azobis(2,4-dimethyl-4-methoxypentanenitrile, 2,2'-azobis(2-methylbutanenitrile) and benzoyl peroxide, lauroyl peroxide, and isopropyl peroxydicarbonate. Initiators are used in conventional amounts, such as 0.001 to 0.1% of the total polymerization mixture.

Reactor headspace is purged with ethylene to keep the ethylene pressure substantially constant. Purging is accomplished by feeding ethylene into the reactor at a rate about 1.05 to about 1.5 times the rate at which ethylene is removed from the reactor in the product stream. The amount of ethylene feed required can be calculated from $$F_E = F_N/A + P_E$$

where $F_E$ is the ethylene feed rate, $F_N$ is the feed rate of inert gas (herein, nitrogen), A is the acceptable fraction of inerts in the reactor head-space, and $P_E$ is the rate at which ethylene leaves the reactor in the product stream. The value of A should be less than about 0.2 moles/mole. $P_E$ obviously includes both combined and free ethylene. The reactor is equipped with a vent to release excess ethylene and maintain constant pressure.

Styrene is added to the product tank at 0.1 weight percent to prevent further reaction and the product is cooled by the brine on the jacket of the product tank. The product is then drained.

The ethylene content is regulated by varying ethylene pressure. Solubility of ethylene in vinyl acetate increases with pressure.

Temperature has the largest effect on the reaction rate since the rate triples for each 10-degree increase in reaction temperature. Increase in residence time has a smaller effect on reaction rate. Pressure affects percent conversion since increased ethylene pressure increases ethylene content and ethylene has a higher chain termination rate than vinyl acetate.

Referring to FIG. 1 in which a typical embodiment of the invention is illustrated, ethylene gas is fed through line 10 and liquid vinyl acetate is fed through line 12 to the packed column or gas-liquid mixer 14. Here, the gas is dissolved in the liquid and flows through line 16 to reactor 18. A mixture of initiator and solvent are stored in vessel 20 and flow through line 22 into reactor 18. Reaction product emerges from reactor 18 through line 20 to product tank 24 where the mixture is depressurized. Tank 24 is provided with vent 27. The product is then transferred via line 25 to a stripping unit 26 where unreacted vinyl acetate is removed through line 29 and replaced with methanol fed through line 32. Ethylene/vinyl acetate copolymer having 20-50 mol % ethylene repeat units in methanol is withdrawn through line 34 for further processing into ethylene/vinyl alcohol copolymer.

Also referring to FIG. 1, purging of the reactor 18 to maintain substantially constant ethylene pressure is accomplished by increasing the ethylene feed through line 10 above that required for the polymerization. The reactor 18 is equipped with a vent 30 to release excess ethylene and maintain constant pressure.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

A continuous stirred tank reactor is used so that the vinyl acetate feed is introduced at the top of a packed column. The reactor is also equipped with a valve to enable a slow purge of the headspace. The unit is operated at steady-state under the following conditions:

| | |
|---|---|
| Reactor pressure | 500-650 psig |
| Reactor temperature | 55-60° C. |
| Methanol flow | 160 mL/hr |
| Vinyl acetate flow | 1342 mL/hr |
| VAZO-52 initiator (azobis(valeronitrile)) | 0.28 g/hr (in methanol feed) |
| Total ethylene flow | 17.2 g-mol/hr |
| Reactor headspace purge rate | 10.0 g-mol/hr |
| Product Flow Rate (10-15% polymer) | 1452 g/hr |
| Product conversion | 10-15 wt % |
| Ethylene content | 32-45 mol % |
| Residence time | 3.17 hr |

The results for specific values of the pressure and temperatures are given in the following table:

TABLE 1

| Example | Temp. °C. | Pressure (psig) | Mol % Ethylene | % Solids | I.V. | Run Length (hours) |
|---|---|---|---|---|---|---|
| 1 | 56 | 500 | 33 | 11.5 | 1.02 | 72 |
| 2 | 56 | 550 | 35 | 10.5 | 1.00 | 48 |
| 3 | 58 | 600 | 36 | 16.4 | 1.03 | 28 |

To illustrate the control achieved during the polymerization, the solids contents of samples taken during Example 1 are given below:

| Elapsed Time (hours) | % Solids |
|---|---|
| 4 | 10.3 |
| 8 | 11.1 |
| 12 | 10.2 |
| 16 | 10.7 |
| 20 | 11.4 |
| 24 | 12.3 |
| 28 | 11.8 |
| 32 | 11.8 |
| 36 | 11.4 |
| 40 | 11.5 |
| 44 | 11.8 |
| 48 | 12.2 |
| 52 | 12.0 |
| 56 | 11.0 |
| 60 | 10.9 |
| 64 | 10.9 |
| 68 | 11.1 |
| 72 | 11.1 |

COMPARATIVE EXAMPLE

A continuous reactor is equipped as shown in FIG. 1, but without the packed column and without provision for a headspace purge. The operating conditions include a temperature of 68° C., a pressure of 650 psig, and an average residence time of 4.0 hours. The initiator used is VAZO-64 (azobis(isobutyronitrile)) at 0.016% of the total feed. The results of solids determinations on samples taken from the reactor illustrate the problem of drift and are given below:

| Time | % Solids |
|---|---|
| 4 | 3.3 |
| 8 | 5.4 |
| 12 | 3.0 |
| 16 | 3.0 |
| 20 | 7.8 |
| 24 | 8.1 |
| 28 | 8.4 |
| 32 | 8.8 |

-continued

| Time | % Solids |
|---|---|
| 36 | 8.2 |
| 40 | 8.5 |
| 44 | 9.8 |
| 48 | 10.0 |
| 52 | 11.5 |
| 56 | 14.7 |

Percent solids is an indication of the degree of conversion of the polymer. The greater variation of this % solids in this comparative example indicates that steady state conditions do not exist.

I.V. (inherent viscosity) is measured at 25° C. using 0.5 grams of polymer per 100 mL of a solvent consisting of 60% by weight phenol and 40% by weight tetrachloroethane.

Unless otherwise specified, all parts, percentages, ratios, etc., are by weight.

The invention has been described in detail with particular reference to preferred embodiments thereof, but it will be understood that variations and modifications can be effected within the spirit and scope of the invention.

We claim:

1. In a process for producing copolymers of ethylene and vinyl acetate in a stirred-tank reactor which contains a reaction mixture comprising ethylene, vinyl acetate, ethylene-vinyl acetate copolymer, catalyst and solvent, and in which reactants are continuously fed into said reactor and reaction mixture having a degree of conversion of 10–50% is continuously withdrawn, the improvement of maintaining the reaction in a steady state condition which comprises the steps of (a) introducing vinyl acetate and ethylene monomers into the reaction mixture in a ratio such as to result in 20–50 mole % ethylene repeat units in the copolymer, and in a premixed condition in which ethylene is dissolved in the vinyl acetate;

(b) maintaining the ethylene pressure at about 300–1000 psi and the reaction temperature at about 50°–90° C.; and (c) continuously purging the free headspace with ethylene to keep the ethylene pressure substantially constant.

2. The process of claim 1 wherein the temperature is maintained at about 50°–65° C.

3. The process of claim 1 wherein the pressure is maintained at about 500–650 psig.

4. The process of claim 1 wherein said reaction mixture comprises an alcohol of 1–8 carbon atoms as a nonreactive solvent.

5. The process of claim 1 wherein the purging of (c) is accomplished by feeding ethylene into the reactor about 1.05–1.5 times the rate at which ethylene is removed from the reactor in the product stream.

* * * * *